UNITED STATES PATENT OFFICE.

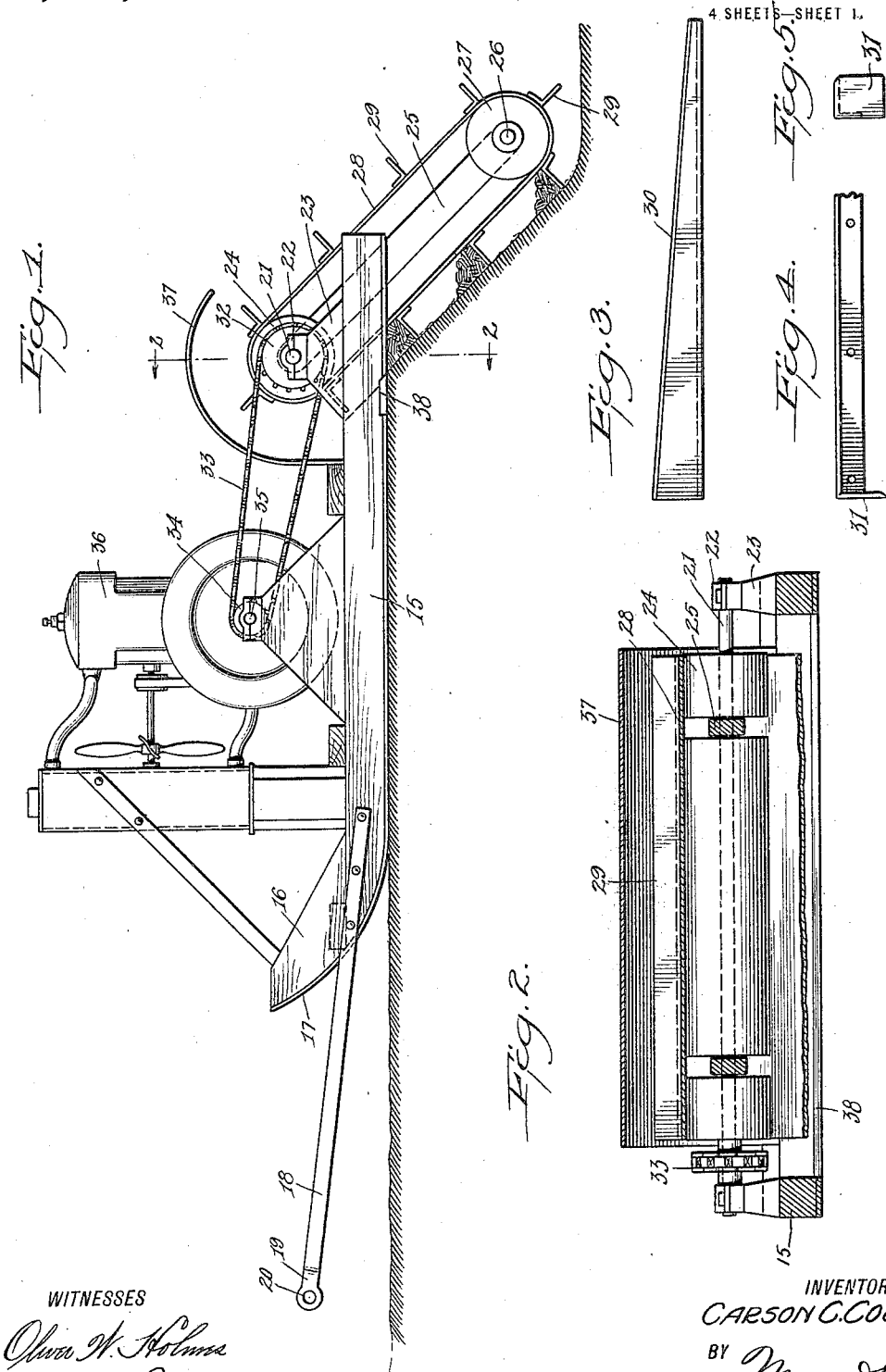

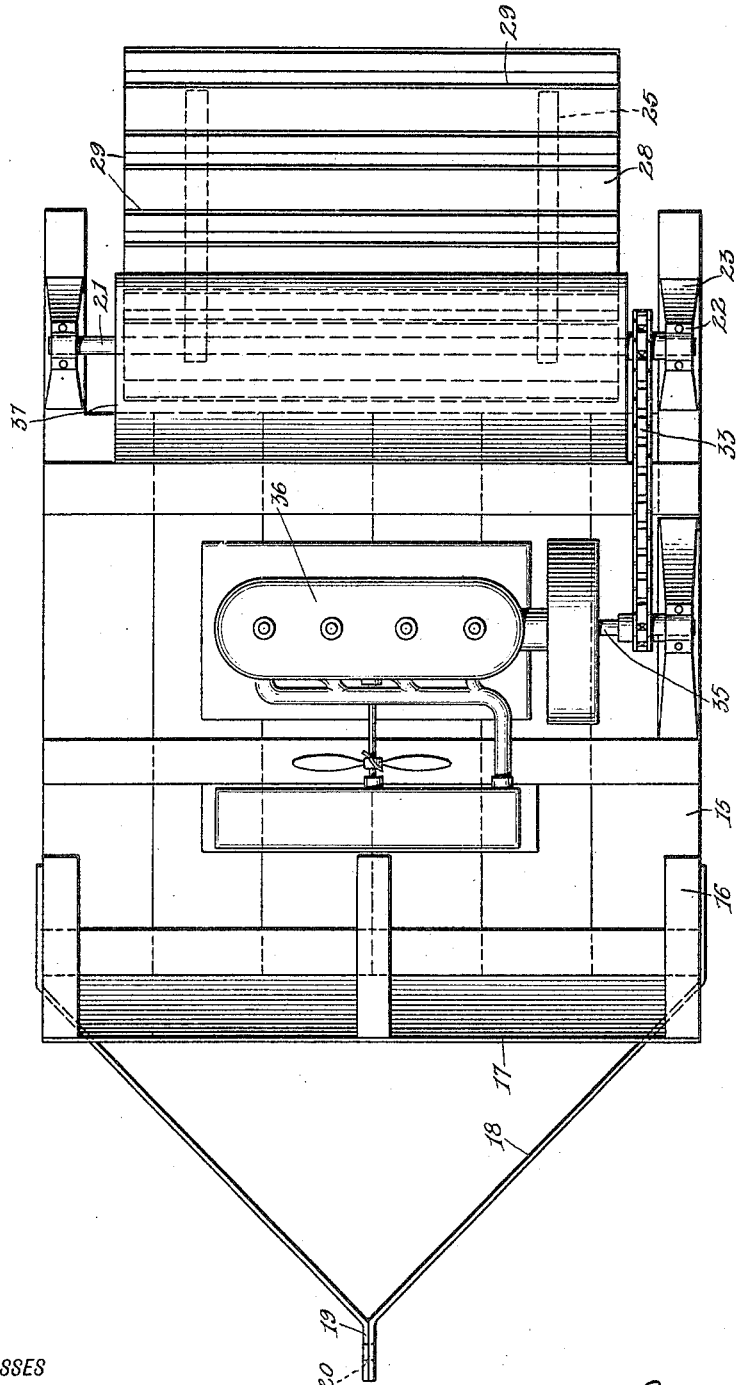

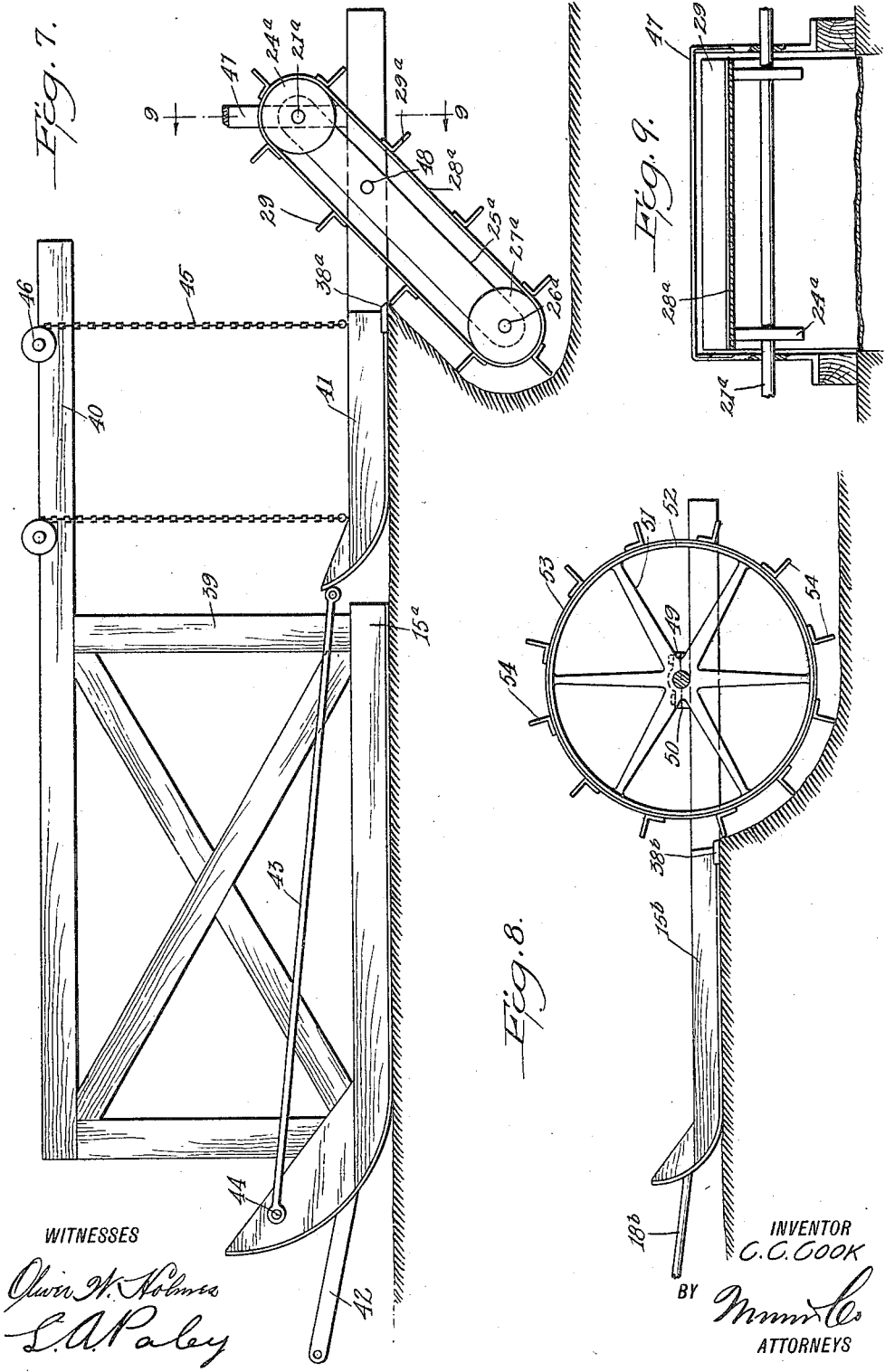

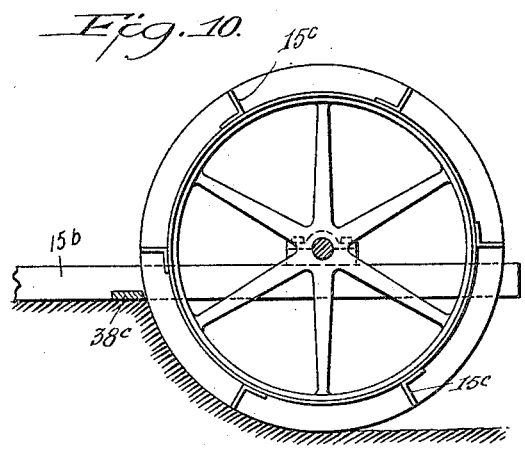
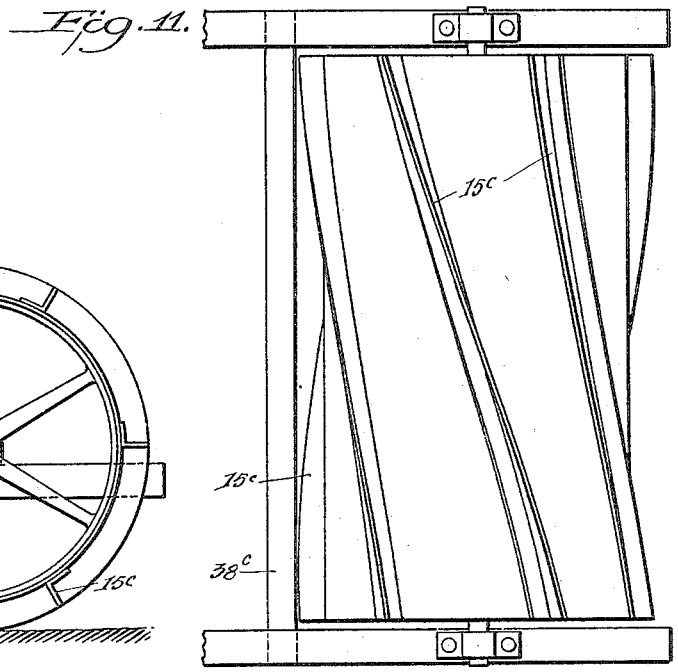
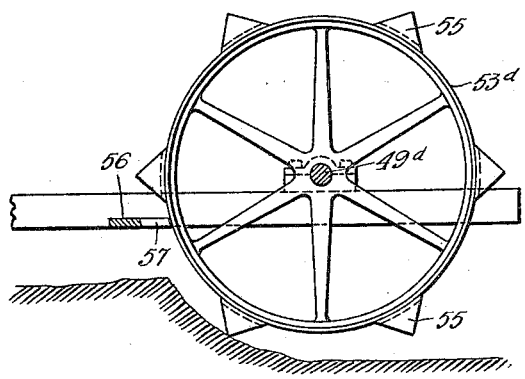
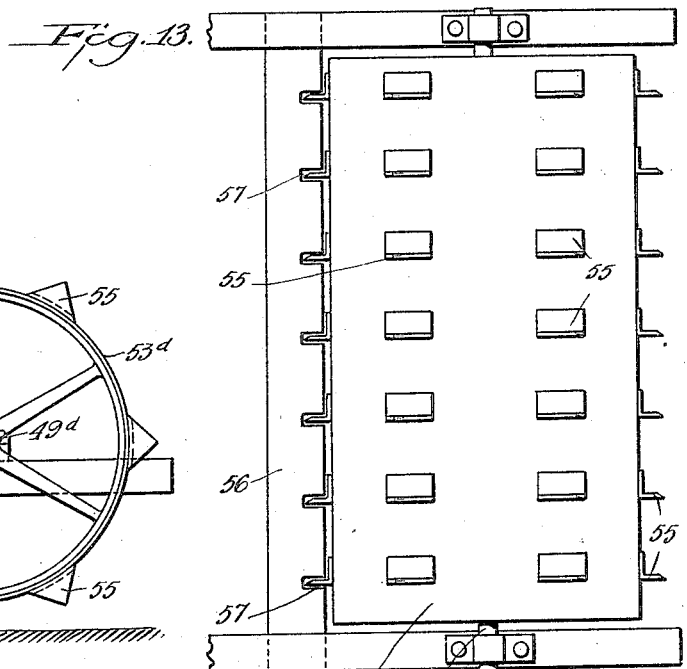

CARSON CAUGHEY COOK, OF STOCKTON, CALIFORNIA.

APPARATUS FOR TILLING THE SOIL.

1,390,089.  Specification of Letters Patent.  Patented Sept. 6, 1921.

Application filed May 15, 1920. Serial No. 381,716.

*To all whom it may concern:*

Be it known that I, CARSON C. COOK, a citizen of Canada, and a resident of Stockton, county of San Joaquin, and State of California, have invented a new and Improved Apparatus for Tilling the Soil, of which the following is a full, clear, and exact description.

This invention relates to an apparatus for tilling the soil, and has reference more particularly to an apparatus which has a rotating element adapted to dig a trench, cut up vegetable growth, and then return the soil to the trench.

An object of this invention is to provide an apparatus in which any weeds, corn stalks, and the like are first pressed flat on the surface of the ground, and are then cut into pieces.

Another object of this invention is to provide an apparatus of the class indicated in which a trench is dug and the loose soil from the trench together with the fragments of weeds, corn stalks, etc., are thrown back again into the trench.

Reference is to be had to the accompanying drawings forming a part of this specification, in which it is understood that the drawings illustrate only one form of the invention together with certain modified forms, and in which—

Figure 1 is a side elevation of my improved tilling apparatus.

Fig. 2 is a section through the apparatus on the line 2—2 of Fig. 1.

Fig. 3 is an elevation of a modified form of cutting blade.

Fig. 4 is an elevation of a second modified form of cutting blade.

Fig. 5 is an end view of the blade shown in Fig. 4.

Fig. 6 is a top view of the apparatus.

Fig. 7 is a side elevation of a modified form of my apparatus.

Fig. 8 is a second modified form of the apparatus.

Fig. 9 is a section through the apparatus on the line 9—9 of Fig. 7.

Fig. 10 is a side elevation of a third modified form of the apparatus.

Fig. 11 is a top view of the apparatus shown in Fig. 10.

Fig. 12 is a side elevation of a fourth modified form of my apparatus.

Fig. 13 is a top view of the apparatus shown in Fig. 12.

Referring to the accompanying drawing by numerals, 15 indicates a sled frame having an upturned front 16, said sled frame being provided on its lower surface with a plate 17 made preferably of metal and adapted to be drawn along the ground. In order to move the sled frame 15 along the ground, a Y-shaped draw-bar 18 is secured to the front 16 on the sled frame, said draw-bar being provided with a link 19 in which is formed a hole 20 adapted to receive a hook from any power means such as a caterpiller tractor, or the like. A jack shaft 21 is rotatably mounted transversely of the sled frame 15 in bearings 22, said bearings being supported on brackets 23 resting on said sled frame. A pulley 24 is secured to said shaft 21. A frame 25 consists of a pair of parallel members pivotally mounted at one end on the shaft 21 and rotatably receiving at their other ends a shaft 26 on which is mounted a pulley 27. A flexible tilling element such as an endless belt 28 is mounted on the pulleys 24 and 27, and a plurality of knives 29 are secured to said belt transversely thereof, said knives being ordinarily L-shaped in cross section, one leg of which forms a cutting knife, and the other leg is secured to said endless belt. These knives may also have an oblique cutting edge 30 as shown in Fig. 3, or they may have cutting elements 31 at each end as shown in Figs. 4 and 5.

A sprocket wheel 32 is secured to the shaft 21 and is connected by a chain 33 to a sprocket wheel 34 secured to a power shaft 35. This shaft 35 may be rotated by any power means such as an internal combustion engine 36 which is mounted on the sled frame 15. An arcuate shaped shield 37 is mounted on the sled frame 15 adjacent the pulley 24 so that as dirt is dug up by the knives 29 to form a trench, said shield will deflect the dirt back into the trench again, thus accomplishing a very effective tillage of the soil. As the sled is drawn over the surface of the ground, the plate 17 will flatten out any weeds, corn stalks, or the like, and a knife 38 is mounted transversely of the sled frame 15 and on the underside thereof, which coöperates with the knives 29 to cut the weeds and corn stalks into small pieces which are thrown back in the trench with the soil, so as to serve as fertilizer for the next crop.

In the modified apparatus shown in Figs. 7 and 9, the sled frame 15ₐ has vertical standards 39 mounted thereon, and horizontal beams 40 extend rearwardly behind the standards 39 so as to overhang a sled frame 41. A draw-bar 42 is secured to the sled frame $15_a$ so that same may be drawn from place to place, and connecting bars 43 are pivotally mounted on one end by means of pins 44 to said sled frame $15_a$ and at the other end are pivotally mounted to the sled frame 41, so that the sled frame 41 closely follows the movements of the sled frame $15_a$. The bars 43 however, permit a limited vertical, relative movement of the sled frames $15_a$ and 41 so as to allow for slight inequalities in the upper surface of the ground. A plurality of chains 45 are secured at one end to the sled 41 and are secured to a hoisting apparatus 46 on the beam 40, so that the sled 41 may be elevated when moving the apparatus from one place to another when it is not desired to till the ground.

A shaft $21_a$ is mounted transversely of the sled frame 41 in brackets 47, and pulleys $24_a$ are mounted on said shaft. A pair of parallel frames $25_a$ are pivotally mounted at one end on the shaft $21_a$ and rotatably receive at their other ends a shaft $26_a$ on which is secured pulleys $27_a$. The frames $25_a$ are secured by means of bolts 48 to the sled frame 41 so that said frames $25_a$ slope downwardly and toward the front of the sled frame 41. An endless belt $28_a$ is mounted on the pulleys $27_a$ and $24_a$, said endless belt carrying knives $29_a$ similar to those used in the apparatus shown in Fig. 1. Thus when the machine is moved along the ground, the dirt is dug up by the knives $29_a$ so as to form a trench and is carried upwardly and rearwardly and again returned to the trench. A knife $38_a$ is secured to the sled frame 41 and serves a purpose similar to that of the knife 38. It is understood that the shaft $21_a$ may be rotated by any power means such as an internal combustion engine as shown in Fig. 1.

In the apparatus shown in Figs. 8, 10, and 11, the sled frame $15_b$ is moved from place to place by draw-bars $18_b$. A shaft 49 is mounted transversely of the sled frame $15_b$ in bearings 50 and a pair of wheels having spokes 51 and rims 52 are secured to said shaft 49. A drum 53 is secured to the outside periphery of the wheel rim 52, and a plurality of cutting knives 54 are secured to the drum 53 substantially parallel or nonparallel to the axis of the shaft 49. A knife $38_b$ is secured transversely of the sled frame $15_b$ to the lower side thereof, said knife coöperating with the knives 54 to cut up the weeds and corn stalks pressed flat on the ground by the sled. The shaft 49 is rotated by any power means such as an internal combustion engine as shown in Fig. 1, so that the dirt is dug up so as to form a trench and is carried upwardly and rearwardly by the knives 54 and drum 53 so as to be again returned to the trench. It should be noted that in the apparatus shown in Figs. 10 and 11, the knives $15_c$ are curved so as to give a shearing cut when coöperating with the knife $38_c$.

In the apparatus shown in Figs. 12 and 13, a plurality of individual triangular shaped knives 55 are secured to the drum $53_d$, said knives being L-shaped in cross section, and being arranged in groups on the drum $53_d$ so that each group of knives is in annular alinement. The knife 56 is provided with a plurality of slots 57 along its cutting edge, each slot being adapted to register and coöperate with one group of knives 55 so that when the shaft $49_d$ is rotated, the weeds, corn stalks, and the like will be positively cut.

I would state in conclusion that while the illustrated examples constitute a practical embodiment of my invention together with certain modifications, I do not wish to limit myself precisely to the mechanical details herein described, since manifestly the same can be considerably varied without departing from the spirit of the invention as defined in the appended claims.

Having thus described my invention, I claim as new and desire to secure by Letters Patent:

1. An apparatus for tilling the soil, a sled adapted to be dragged over the ground so as to bend the vegetable growth flat on the ground, power means on the sled, a knife secured to and extending transversely of the frame, and a movable cutting element mounted on the frame in rear of the knife and adjacent thereto, said cutting element coöperating with the knife to cut the vegetable growth into pieces and to dig a trench and to return the earth and pieces of vegetable growth back into the trench.

2. In an apparatus for tilling soil, a sled, means for dragging said sled along the surface of the ground so as to bend vegetable growth flat on the ground, power means associated with said sled, a knife mounted transversely of said sled, and a flexible and movable cutting element actuated by said power means, and adapted to coöperate with said knife so as to cut said vegetable growth to pieces, to dig a trench behind said sled as said sled is dragged along the surface of the ground, and to return the earth and pieces of vegetable growth to said trench.

3. In an apparatus for tilling the soil, a sled, means for dragging said sled over the surface of the ground so as to bend vegetable growth flat on said surface, a second sled connected to the first mentioned sled, a digging element movably mounted on said second sled, means for moving said element so that a trench will be dug behind said second sled as said sleds are dragged over the surface of the ground, and means for elevating said second sled with respect to the first sled so that said digging element will be disengaged from the ground.

4. A device as described in claim 3, characterized by a knife secured transversely of said second sled, said digging element being adapted to coöperate with said knife so as to cut said vegetable growth into pieces, and being also adapted to return said pieces of vegetable growth and the earth to said trench.

5. In an apparatus for tilling the soil, a sled, a transverse knife on the sled, a shaft rotatably mounted transversely of said sled, means for dragging said sled over the surface of the ground so that vegetable growth will be bent level with said surface, a plurality of wheels secured to said shaft, a drum secured to said wheels around their periphery, a plurality of curved knives secured to the outside periphery of said drum, and means for rotating said shaft so that said knives will coöperate with the transverse knife to cut the vegetable growth into pieces and will dig a trench behind said sled as said sled is dragged along the ground, and will return said pieces of vegetable growth and the earth into said trench.

6. An apparatus for tilling the soil, a sled, means for dragging said sled over the surface of the ground so that vegetable growth will be bent level with said surface, a shaft rotatably mounted transversely of said sled, a plurality of wheels secured to said shaft, a drum secured to the periphery of said wheels, a plurality of cutting elements secured to said drum and arranged in groups with each group of cutting elements in annular alinement, a knife mounted transversely of said sled and provided with a plurality of slots, each slot being adapted to register and coöperate with one group of cutting elements, and means for rotating said shaft so that said cutting elements and said knife will coöperate to cut the vegetable growth into pieces, and so that said cutting elements will dig a trench behind said sled during the forward movement thereof, said cutting elements being also adapted to return the earth and the pieces of vegetable growth to said trench.

CARSON CAUGHEY COOK.